United States Patent
Zhang et al.

(10) Patent No.: US 10,894,908 B2
(45) Date of Patent: Jan. 19, 2021

(54) ENCAPSULATES

(71) Applicant: Encapsys, LLC, Appleton, WI (US)

(72) Inventors: Hanwei Zhang, Appleton, WI (US); Chilwin Tanamal, Appleton, WI (US); John Charles DeBraal, Appleton, WI (US); Travis Ian Bardsley, Appleton, WI (US); Biao Duan, Appleton, WI (US); Nianxi Yan, Appleton, WI (US)

(*) Notice: Subject to any disclaimer, the term of this patent is extended or adjusted under 35 U.S.C. 154(b) by 34 days.

(21) Appl. No.: 15/880,743

(22) Filed: Jan. 26, 2018

(65) Prior Publication Data

US 2018/0215982 A1     Aug. 2, 2018

Related U.S. Application Data

(60) Provisional application No. 62/451,387, filed on Jan. 27, 2017.

(51) Int. Cl.
| | |
|---|---|
| *C09K 5/06* | (2006.01) |
| *B01J 13/18* | (2006.01) |
| *F28D 20/02* | (2006.01) |
| *B01J 13/02* | (2006.01) |
| *C09K 5/02* | (2006.01) |

(52) U.S. Cl.
CPC .............. *C09K 5/066* (2013.01); *B01J 13/02* (2013.01); *B01J 13/18* (2013.01); *C09K 5/02* (2013.01); *C09K 5/06* (2013.01); *C09K 5/063* (2013.01); *F28D 20/023* (2013.01)

(58) Field of Classification Search
CPC ... C09K 5/00; C09K 5/02; C09K 5/06; C09K 5/063; C09K 5/066
USPC ........................................................ 252/77
See application file for complete search history.

(56) References Cited

U.S. PATENT DOCUMENTS

| | | | | |
|---|---|---|---|---|
| 4,100,092 | A * | 7/1978 | Spauschus | C09K 5/063 165/10 |
| 4,711,813 | A * | 12/1987 | Salyer | C08K 5/01 252/70 |
| 4,797,160 | A * | 1/1989 | Salyer | C04B 24/00 106/18.19 |
| 5,456,852 | A * | 10/1995 | Isiguro | B01J 13/02 165/10 |
| 5,916,478 | A * | 6/1999 | Nakahira | B01J 13/02 252/73 |
| 7,166,355 | B2 * | 1/2007 | Jahns | B01J 13/185 427/372.2 |

(Continued)

FOREIGN PATENT DOCUMENTS

CA     2716797     9/2009

OTHER PUBLICATIONS

PCT/US2018/015420 International Search Report, dated Apr. 26, 2018, Encapsys, LLC.

*Primary Examiner* — Jane L Stanley

(57) ABSTRACT

The invention discloses a microencapsulated phase change material having a specific Thermal Efficiency Index (TEI).

$$TEI = \alpha(R\Delta T) * \beta(R\Delta H) * \gamma(RMP) * \delta(RTGA@180) * \in (RFW)$$

The problem of achieving effective and efficient microencapsulated phase change material can be solved to yield a commercially useful material having the described combination of physical and chemical characteristics based on the parameters described in the specification. Microcapsules according to the invention are highly effective at delivering enhanced thermal performance as compared to conventional microcapsules.

15 Claims, 2 Drawing Sheets

(56) References Cited

U.S. PATENT DOCUMENTS

| | | | |
|---|---|---|---|
| 7,572,397 B2 | 8/2009 | Jahns et al. | |
| 8,679,629 B2 * | 3/2014 | Zhao | B01J 13/14 428/321.5 |
| 8,784,984 B2 * | 7/2014 | Grey | B01J 13/14 252/180 |
| 2004/0076826 A1 | 4/2004 | Lee | |
| 2007/0248824 A1 * | 10/2007 | Lang-Wittkowski | B01J 2/20 428/402.24 |
| 2008/0008858 A1 * | 1/2008 | Hong | E04D 5/12 428/143 |
| 2008/0318048 A1 * | 12/2008 | Amrhein | B01J 13/02 428/402.21 |
| 2010/0087115 A1 * | 4/2010 | Davis | B01J 13/22 442/136 |
| 2012/0193572 A1 | 8/2012 | MacKay | |
| 2016/0040054 A1 | 2/2016 | Magill et al. | |

* cited by examiner

ENCAPSULATES

CROSS-REFERENCE TO RELATED APPLICATIONS

This application claims benefit of U.S. Provisional Application No. 62/451,387 filed Jan. 27, 2017.

FIELD OF THE INVENTION

This invention relates to capsule manufacturing processes and microcapsules produced by such processes, and more particularly a process for forming microencapsulated phase change materials and an improved article based on such microcapsules.

DESCRIPTION OF THE RELATED ART

Various processes for microencapsulation, and exemplary methods and materials are set forth in various patents such as Schwantes (U.S. Pat. No. 6,592,990), Nagai et al. (U.S. Pat. No. 4,708,924), Baker et al. (U.S. Pat. No. 4,166,152), Woiciak (U.S. Pat. No. 4,093,556), Matsukawa et al. (U.S. Pat. No. 3,965,033), Matsukawa (U.S. Pat. No. 3,660,304), Ozono (U.S. Pat. No. 4,588,639), Irgarashi et al. (U.S. Pat. No. 4,610,927), Brown et al. (U.S. Pat. No. 4,552,811), Scher (U.S. Pat. No. 4,285,720), Shioi et al. (U.S. Pat. No. 4,601,863), Kiritani et al. (U.S. Pat. No. 3,886,085), Jahns et al. (U.S. Pat. Nos. 5,596,051 and 5,292,835), Matson (U.S. Pat. No. 3,516,941), Chao (U.S. Pat. No. 6,375,872), Foris et al. (U.S. Pat. Nos. 4,001,140; 4,087,376; 4,089,802 and 4,100,103), Greene et al. (U.S. Pat. Nos. 2,800,458; 2,800,457 and 2,730,456), Clark (U.S. Pat. No. 6,531,156), Saeki et al. (U.S. Pat. Nos. 4,251,386 and 4,356,109), Hoshi et al. (U.S. Pat. No. 4,221,710), Hayford (U.S. Pat. No. 4,444,699), Hasler et al. (U.S. Pat. No. 5,105,823), Stevens (U.S. Pat. No. 4,197,346), Riecke (U.S. Pat. No. 4,622,267), Greiner et al. (U.S. Pat. No. 4,547,429), and Tice et al. (U.S. Pat. No. 5,407,609), among others and as taught by Herbig in the chapter entitled "Microencapsulation" in Kirk-Othmer Encyclopedia of Chemical Technology, V. 16, pages 438-463.

Other useful methods for microcapsule manufacture are: Foris et al., U.S. Pat. Nos. 4,001,140 and 4,089,802 describing a reaction between urea and formaldehyde; Foris et al., U.S. Pat. No. 4,100,103 describing reaction between melamine and formaldehyde; and British Pat. No. 2,062,570 describing a process for producing microcapsules having walls produced by polymerization of melamine and formaldehyde in the presence of a styrenesulfonic acid. Forming microcapsules from urea-formaldehyde resin and/or melamine formaldehyde resin is disclosed in Foris et al., U.S. Pat. No. 4,001,140; Foris et al., U.S. Pat. No. 4,089,802; Foris et al., U.S. Pat. No. 4,100,103; Foris et al., U.S. Pat. No. 4,105,823; and Hayford, U.S. Pat. No. 4,444,699. Alkyl acrylate-acrylic acid copolymer capsules are taught in Brown et al., U.S. Pat. No. 4,552,811. Each patent described throughout this application is incorporated herein by reference to the extent each provides guidance regarding microencapsulation processes and materials.

Interfacial polymerization is a process wherein a microcapsule wall such as polyamide, an epoxy resin, a polyurethane, a polyurea or the like is formed at an interface between two phases. Riecke, U.S. Pat. No. 4,622,267 discloses an interfacial polymerization technique for preparation of microcapsules. The core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in Greiner et al., U.S. Pat. No. 4,547,429. Matson, U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast (amine and aldehyde) resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in an oil phase. Polymerization occurs at the phase boundary. Thus, a polymeric capsule shell wall forms at the interface of the two phases thereby encapsulating the core material. Wall formation of polyester, polyamide, and polyurea capsules also typically proceeds via interfacial polymerization.

Jahns, U.S. Pat. No. 5,292,835 teaches polymerizing esters of acrylic acid or methacrylic acid with polyfunctional monomers. Specifically illustrated are reactions of polyvinylpyrrolidone with acrylates such as butanediol diacrylate or methylmethacrylate together with a free radical initiator.

Common microencapsulation processes can be viewed as a series of steps. First, the core material which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Jabs et al., U.S. Pat. No. 4,947,152 teaches microcapsules with polyurea walls. The wall is the reaction product of an aromatic isocyanate with an isocyanate reactive group. The isocyanate reactive group can include di- and polyamines such as N-hydroxyethylethylenediamine and ethylene-1,2-diamine.

Hotz et al., U.S. Pat. Pub. 2013/0089590 teaches a fragrance microcapsule with a polyurea wall. The shell in the reaction product of at least two difunctional isocyanates and a difunctional amine.

EP 1693104 Maruyyama discloses microcapsules having a polyurethane or polyurea wall obtained from polycondensation of a polyfunctional isocyanate with a polyfunctional amine.

Schwantes, U.S. Pat. Pub. 2009/0274905 teaches cationic microcapsule particles where the wall is the reaction product of an amine acrylate with a multifunctional methacrylate in the presence of an acid and initiator; or alternatively an acid acrylate and multifunctional (meth)acrylate in the presence of a base and initiator.

A problem in the art has been that the ability to create a microcapsule while maintaining qualities such as low free wax, high latent heat, melt point at or near temperature of use, high weight retention such as in thermal gravimetric analysis (TGA) at 180° C., and low delta T in terms of difference between melt point peak and resolidification peak, in repeatable cycles. It has been exceedingly difficult to consistently fashion a microcapsule, particularly encapsulating a latent heat material or phase change material to have a melt point peak of not more than 30° C. and a resolidification point of not less than 18° C. where the difference between the respective melt point peak and resolidification peak is able to be controlled in repeated melting and resolidification cycles such that the difference between the melt point peak and resolidification peak is not more than 10° C.

Attempts to solve the problem of a large difference ($\Delta T$) between the melting point and resolidification peak of microencapsulated phase change materials has involved attempts, such as taught by Lee US Publication 2004/0076826 and others, to include minor quantities, usually less than 15% by weight, or even less than 1% of either an inorganic or organic nucleating agent to prevent supercooling effects where solidification is depressed below a material's melting temperature.

Such systems known to date however typically have a latent heat storage density volumetrically less than the heat storage density of the microencapsulated phase change material of the invention.

A need exists for microencapsulated phase change materials having a low difference $\Delta T$ (a delta of 10° C. or less difference) between the melting point peak and resolidification peak, low free wax, high latent heat, melt point at or near temperature of use, high weight retention such as in TGA tests and maintaining such attributes in a capsule stable over repeatable cycles

SUMMARY OF THE INVENTION

Figure 1:
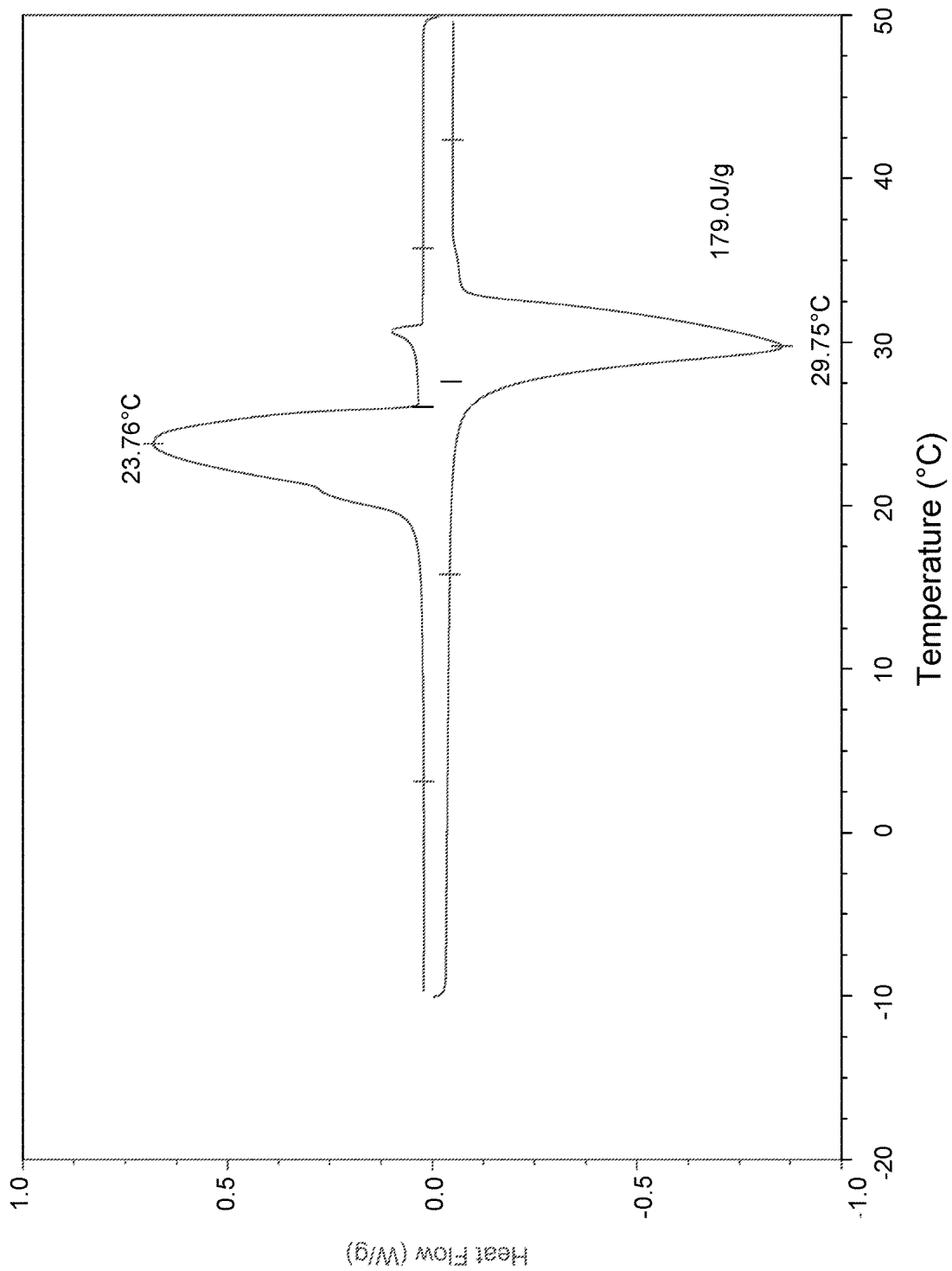
FIG. 1 is a differential scanning calorimetric curve of microcapsules according to Example 9.

The present invention describes a microencapsulated phase change material having a differential scanning calorimetric melt point peak T1 of the microencapsulated phase change material of not more than 30° C. and a resolidification peak T2 of not less than 18° C., and wherein, the absolute value of, the difference between the respective melt point peak T1 and resolidification peak T2 is not more than 10° C. In a further embodiment the microencapsulated phase change material comprises methyl palmitate. In a further embodiment the microencapsulated phase change material has a latent heat of at least 165 Joules per gram. In one aspect the microencapsulated phase change material comprises a blend of methyl palmitate and polyethylene. The phase change material can comprise a blend comprising from 50% to 97%, from 55% to 97%, or even 75% to 85% by weight (wt %) methyl palmitate. In another embodiment the microencapsulated phase change material comprises from 70 to 95 wt % methyl palmitate, from 80 to 95 wt % methyl palmitate, or even from 82 to 88 wt % methyl palmitate. In yet a further embodiment the microencapsulated phase change material comprises (A) 0.1 to 20 wt % of straight chain alkane, or even 0.1 to 10 wt % of straight chain alkane, (B) 70 to 98 wt % of methyl palmitate and (C) 0 to 25 wt %, or even 0.1 to 25 wt %, or even 0.1 to 5 wt %, or even 0.1 to 2 wt % of one or more additional phase change materials other than phase change materials (A) and (B), wherein the weight percent of (A), (B), and (C) is based on the total weight of the phase change material. Ingredient (C) can be a polyalkylene, preferably a polyethylene or polypropylene, more preferably a low molecular weight polyethylene or polypropylene. The melt point of the phase change material, T1 for purposes of the calculation, is the melt temperature of the blend, thus individual components can be higher than 30° C.

In one aspect, the microencapsulated phase change material comprises a particle comprising a core material and a wall material that surrounds the core material, the particle having a Thermal Efficiency Index greater than 0, or of at least 1000, or even of at least 10,000.

In one aspect, the particle's wall material comprises a material selected from the group consisting of polyacrylate, polymethacrylate, polyamine, polyurea, polyurethane, melamine formaldehyde, and mixtures thereof. The particle's core material can comprise a material selected from the group consisting of 50 to 97 wt % of a methyl ester derived from palm oil, and from 0.1 to 20 wt % of a straight chain alkane based on total weight of the core. The core can include in addition from 0.1 to 25 wt % of a wax. The wax can be selected from the group of waxes consisting of alkane wax, polyethylene wax, carnauba wax, candelilla wax, vegetable wax, beeswax and paraffin wax.

In one aspect, the particle is comprised of at least 1 wt % of core material. In another aspect, the particle is comprised of from about 20 to about 95 wt % of a core material, or even from about 50 to about 90 wt % of a core material.

Desirably the microencapsulated phase change material has a differential scanning calorimetric melt point peak T1 of the microencapsulated phase change material at not more than 30° C. and a resolidification peak T2 at not less than 18° C., and wherein the absolute value of the difference between the respective melt point peak T1 and resolidification peak T2 is not more than 10° C.

In one aspect, the microencapsulated phase change material core is a methyl ester selected from methyl laurate, methyl myristate, methyl palmitate, methyl stearate, or methyl oleate. Usefully, the phase change material has a latent heat of at least 165 Joules per gram.

The microencapsulated phase change material can comprise a core with the phase change material comprising a blend of methyl palmitate, octacosane and alkane wax, or optionally octadecane. The phase change material can comprise from 50 to 95 wt % of methyl palmitate; from 0 to 10 wt %, or even to 20 wt %, of octacosane; and from 0 to 30 wt %, or even to 40 wt %, of polyethylene wax. Alternatively, the phase change material can comprise from 55 to 95 wt % of methyl palmitate; from 0.1 to 10 wt % of octacosane; and from 0 to 30 wt % of one or more additional phase change materials other than methyl palmitate and octacosane, wherein the weight percent of the individual phase change materials is based on the total weight of the phase change material. Preferably the latent heat storage density is greater than 165 Joules per gram.

In a further embodiment the invention describes an improved article of manufacture incorporating the microencapsulated phase change materials described herein. The article of manufacture can be selected from textiles, foams, pillows, mattresses, bedding, cushions, cosmetics, medical devices, packaging, cooling fluids, wallboard, and insulation.

DETAILED DESCRIPTION

Phase change materials, also known as latent heat absorbers, have found use in a variety of industrial, commercial and consumer applications such as on clothing, mattresses, bedding, pillows, packaging, containers, construction materials, wallboard materials, ceiling tiles, flooring, computer heat sinks, diving suites, cosmetics, and other applications where thermal moderation, thermal protection or heat dissipation is desirable, and particularly in repeatable thermal cycles.

Desirably phase change materials are sought which have thermal stability and are not degraded over repeated liquid solid phase change cycles. The present invention teaches a microencapsulated phase change composition surprisingly having a low difference $\Delta T$ between the melting point peak and resolidification peak, along with a surprisingly high latent heat storage density.

The invention surprisingly teaches a combination having a beneficial low difference $\Delta T$ between the melting point peak and resolidification peak, but also a high latent heat storage density than reported in current commercial products.

Surprisingly a high performing microencapsulated phase change material can be fashioned from a combination meeting the following relationship of a Thermal Efficiency Index (TEI).

$$TEI = \alpha(R\Delta T) * \beta(R\Delta H) * \gamma(RMP) * \delta(RTGA@180) * \epsilon(RFW) \qquad \text{Formula 1:}$$

In the invention applicants discovered that the problem of achieving a microencapsulated phase change material having the combination of properties of the described delta T, melt point, low free wax, high TGA weight retention, in repeatable freeze thaw cycles can be solved to yield a surprisingly useful material having a desired combination of physical and chemical characteristics not able to be realized prior to the invention. Such chemical and physical characteristics are defined by the following parameters.

$$TEI = \alpha(R\Delta T) * \beta(R\Delta H) * \gamma(RMP) * \delta(RTGA@180) * \epsilon(RFW)$$

Where:
$\alpha$=constant weighting for $R\Delta T$ (=20)
$\beta$=constant weighting for $R\Delta H$ (=10)
$\gamma$=constant weighting for RMP (=5)
$\delta$=constant weighting for RTGA @180 (=20)
$\epsilon$=constant weighting for RFW (=15)
$R\Delta T$=rating for the difference between the peak temperatures on the melting and crystallization curves (0 to 1, <10° C.); scale is a sliding inverse scale from 0 to 1
$R\Delta H$=rating for melting latent heat (0 or 1, >165 J/g)
RMP=rating for peak melting temperature (0 to 1 based on relative difference from 28.5° C. in the range from 26° C. to 31° C.); rating is 1 at 28.5° C.
RTGA @180=rating for percent weight remaining at 180° C.; rating is 0 for 94% or less; rating is 0 to 1 for range 94% to 96%; rating is 1 for 96% or greater
RFW=rating for free wax (core) (0 to 1, <3%); scale is inverse; rating of 1 equals 0% free wax The importance of each parameter is as follows:
a lower $\Delta T$ allows phase change material to get recharged much more quickly so it is available to provide expected performance;
a higher $\Delta H$ provides more latent heat storage density for comfort;
closer melting point to 28.5° C. would be ideal as it is the skin temperature that provides most comfort while body is at rest;
TGA @180 measurement represents the thermal stability of the product, with the higher the number, the better stability it would have in withstanding an increase in temperature, in particular during processing; and
free wax (core) level represents the level of phase change material outside of the capsule. The lower the level, the better the capsule would be.

For the five parameters in the TEI equation in Formula 1. A constant weighting is assigned to each parameter. Twenty is the maximum weighting and the weighting is assigned based on the relative influence on product performance.

Such parameters may be combined to yield a Thermal Efficiency Index.

In one aspect, applicants microencapsulated phase change material comprises a core material and a shell or wall material, said microencapsulated phase change material having a Thermal Efficiency Index greater than 0, or even greater or equal to 100, and preferably at least 600, and more preferably greater or equal to 100, or even 10,000 or greater. Values greater or equal to 600, or greater or equal to 1000 are desirable as more beneficial. The greater the TEI. The greater the perceived benefits.

Microencapsulated phase change material according to formula 1 exhibits a low difference $\Delta T$, high heat storage density and ability for multiple phase transitions efficiently and without leakage or loss of thermal effect. The greater the value of TEI, the more beneficial is the microencapsulated phase change material.

The combination of the invention has closely spaced melt and freeze points with not more than about 10° C. separation between melt point peak and resolidification peak.

The microcapsules of the invention can be incorporated dry or as a coating or gel into a variety of commercial products including incorporated into foams, mattresses, bedding, cushions, added to cosmetics or to medical devices, incorporated into or onto packaging, dry wall, construction materials, heat sinks for electronics, cooling fluids, incorporated into insulation, used with lotions, incorporated into gels including gels for coating fabrics, automotive interiors, and other structures or articles, including clothing, footwear, personal protective equipment and any other article where thermal moderation or a cooling effect is deemed desirable.

The microcapsules protect and separate the phase change materials from the external environment. This facilitates design of microcapsule systems with distinct and narrow melt and resolidification peaks. The microcapsules facilitate improving flowability of the phase change materials enhancing ease of incorporation into articles such as foams or gels. The microcapsules can be used neat, or more often blended into coatings, gels or used as an aqueous slurry. The microcapsules help preserve the repeated activity of the phase change material and retain the phase change material to prevent leakage or infusion into nearby components when isolation of the microcapsules is desired.

Microencapsulation can be accomplished by a variety of techniques including physical methods such as spinning disk, fluidized bed, extrusion, spray drying or chemical methods such as coacervation, emulsion, polymerization, interfacial polymerization, solvent evaporation, layered deposition, fluid expansion, precipitation, phase separation and the like. Desirably, the microcapsules can be microcapsules or microcapsules less than 100 microns, or of a size less than 20 microns, or even less than 10 microns, or even less than 1 micron.

The microcapsules of the present invention are manufactured according to the various processes described in the background section hereof, and illustrated in the appended examples. The microencapsulation processes are generally chemical microencapsulation based on techniques such as coacervation, free radical polymerization, interfacial polymerization, or in-situ polymerization.

The phase change material of the invention is an alkyl ester of a hexadecanoate, and preferably the methyl ester such as methyl palmitate. Methyl palmitate, also known as methyl hexadecanoate, for example, has found little commercial adoption in microencapsulated phase change materials in the absence of the identification of the Thermal Efficiency Index of the invention as guidance.

Methyl esters of palm oil typically show multiple and broad melting transitions. Optionally to narrow peaks the methyl esters can be fractionated and optional additional materials such as nucleating agents could be added, though not required. Optionally, other additives could include halogenated flame retardants, such as mono- or poly-chlorinated or brominated paraffins. Flame retardants by way of illustration can include bromooctadecane, bromopentadecane, bromoeicosane or inorganics such as antimony oxide, or other oxides such as decabromodiphenyl oxide and the like.

A variety of methyl esters can be derived from palm oil, including:

|  |  | Melt Point |
| --- | --- | --- |
| methyl laurate | (C12) | 5° C. |
| methyl myristate | (C14) | 18.5° C. |
| methyl palmitate | (C16) | 30.5° C. |
| methyl stearate | (C18) | 39.1° C. |
| methyl oleate | (C18) | −20° C. |

The Thermal Efficiency Index of the invention overcomes a problem of assembling useful commercial microencapsulated phase change product based on alkyl esters derived from palm oil. Microencapsulated phase change materials having a Thermal Efficiency Index greater than 0 and preferably of at least 600, surprisingly have a low $\Delta T$ difference in heating and melting, and have a high volumetric heat storage density, as compared to systems outside of parameters which the TEI provides.

Test Methods

Latent Heat, Melt Temperature, and Delta T Determination

Instrument used is the TA DSC Q2000 (New Castle, Del.). The procedure is as follows:
1. Approximately a 3 to 10 mg dry sample of microcapsule is weighed into a T-Zero Hermetic pan.
2. Sample is placed on the DSC instrument with the following steps that are programmed into the software:
   Ramp 1.00° C./min from 50° C. to −10.00° C.
   Ramp 1.00° C./min from −10.00° C. to 50.00° C.
3. Resultant curve (as shown in FIG. 1) was then analyzed for the three properties:
   a. Latent heat, determined by integrating the area under the melting curve peak.
   b. Melt temperature, defined by the peak temperature on the melting curve.
   c. Delta T, defined by the difference between the peak temperatures on the melting and crystallization curves.

TGA Weight at 180° C., Determination

Figure 2:
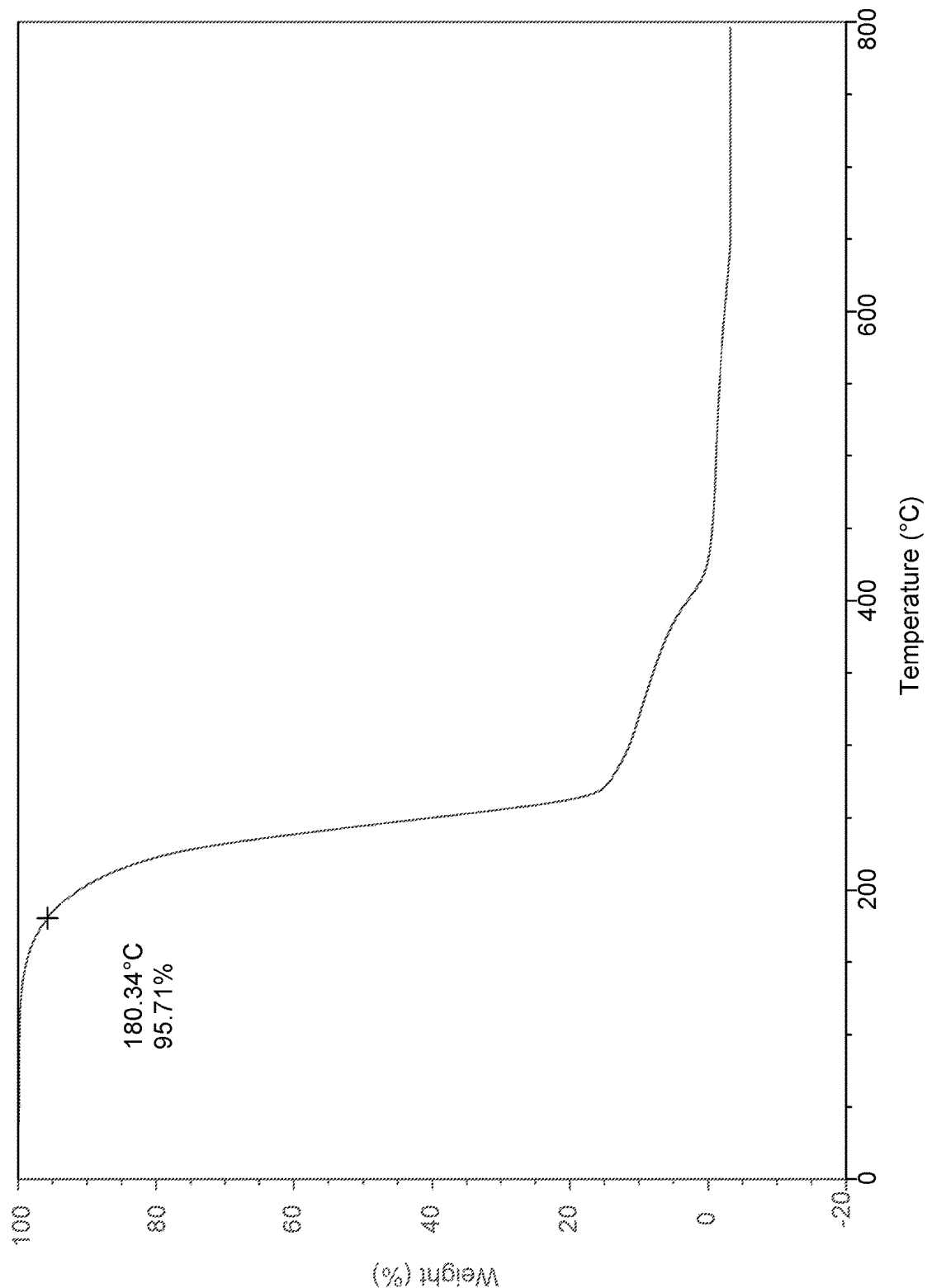
FIG. 2 is a thermal gravimetric analyzer curve of microcapsules according to Example 9.

Instrument used is the TA Q50 TGA (Thermal Gravimetric Analyzer). The procedure is as follows:
1. Approximately 5-15 mg of dry sample is placed on to the weighing pan.
2. The sample is run on the instrument with the following step:
   Ramp 20.0° C./min to 800° C.
3. The resultant curve (as shown in FIG. 2) is then analyzed to determine the weight left at 180° C.

Free Wax Determination

Equipment used is the Agilent 7890N GC utilizing Chem Station Software and the Phenomenex's ZB-1HT Inferno Column @ 10M, 0.32 mm, 0.25 μm, 100%-dimethylpolysiloxane phase or equivalent. The method used is:
1. Temp: 50° C. for 1 minute then heat to 280° C. @ 10 C/min.
2. Injector: 270° C. with Split Ration of 10:1
3. Detector: 320° C.
4. 2 μl injection The procedure is as follows:
1. 200 mg+/−5% of dried powder is prepared in a 20 ml scintillation vial.
2. 10 ml of hexane is added to the vial with a calibrated air displacement micropipette and vial is placed on vortex mixer for exactly 5 seconds.
3. The sample is then left sitting for 2 minutes followed by removal of the hexane layer utilizing a syringe.
4. A 0.45 um syringe filter (or better) is placed on the syringe for transfer to a GC vial. The vial is then capped and run on a GC.
5. Resultant graph containing total area count and the internal standard area count is compared against a calibration curve to determine the % free core amount.

EXAMPLES

In the following examples, the abbreviations correspond to the following materials.

| Trade Name | Company/City | Material |
| --- | --- | --- |
| TA | TA Instruments, New Castle, DE | |
| CD 9055 | Sartomer, Exetor, PA | acidic acrylate adhesion promoter |
| M 90 | Baker Hughes, Houston, TX | alkane wax |

Example 1

|  | Grams |
|---|---|
| Internal Phase | |
| methyl palmitate | 858.3 |
| N-octadecane | 151.5 |
| alkane wax, M 90 | 10.2 |
| 2,2'-azodi(2-methylbutyronitrile) | 1.8 |
| 1,1'-azobis(cyanocyclohexane) | 1.8 |
| acidic acrylate adhesion promoter, CD 9055 | 3.0 |
| tris (2-hydroxy ethyl) isocyanurate triacrylate | 72 |
| ethylene glycol dimethacrylate | 102 |
| Water Phase | |
| water | 1440 |
| polyvinyl alcohol solution 5% | 360 |
| 4,4'-azobis(4-cyanovaleric acid) | 6.0 |

The water phase preparation is begun by mixing polyvinyl alcohol solution and water, and then holding at 65° C. The acrylic monomers phase preparation is begun by melting tris (2-hydroxy ethyl) isocyanurate triacrylate at 60 C, then mixing with ethylene glycol dimethacrylate and acidic acrylate adhesion promoter until homogenous. The internal phase preparation is begun by mixing the remaining internal phase material compositions that consist of phase change core materials and initiator, and then heated from 40° C. to 65° C. in 45 minutes, held at 65° C. for 90 min with a nitrogen blanket at 100 cc/min. After the internal phase is ready, the acrylic monomers phase is added, and held for 20 min. The whole oil phase is then transferred to water phase, and milled to form a stable emulsion at target size (i.e. 10 um) over 60 minutes. The final median size of capsules is 9.2 um. After milling, 4,4'-azobis(4-cyanovaleric acid) is added. The batch is heated to 75° C. in 45 minutes, then heated to 95° C. in 420 minutes, and held at 95° C. for 360 minutes.

Example 2

|  | Grams |
|---|---|
| Internal Phase | |
| methyl palmitate | 143.1 |
| N-octadecane | 25.2 |
| alkane wax, M 90 | 1.7 |
| 2,2'-azodi(2-methylbutyronitrile) | 0.3 |
| 1,1'-azobis(cyanocyclohexane) | 0.3 |
| acidic acrylate adhesion promoter, CD 9055 | 0.5 |
| tris (2-hydroxy ethyl) isocyanurate triacrylate | 12 |
| ethylene glycol dimethacrylate | 18 |
| Water Phase | |
| water | 240 |
| polyvinyl alcohol solution 5% | 60 |
| 4,4'-azobis(4-cyanovaleric acid) | 1 |

The batch is made by following the same process as Example 1, except by using the above formula, and the size is targeted at 5 um. The final median size of capsules is 5.2 um.

Example 3

The batch is made by following the same process and formula as Example 2, except that the size is targeted at 20 um. The final median size of capsules is 23 um.

Example 4

The batch is made by following the same process and formula as Example 2, except that the size is targeted at 30 um. The final median size of capsules is 28 um.

Example 5

|  | Grams |
|---|---|
| Internal Phase | |
| methyl palmitate | 144.5 |
| N-octadecane | 25.5 |
| 2,2'-azodi(2-methylbutyronitrile) | 0.3 |
| 1,1'-azobis(cyanocyclohexane) | 0.3 |
| acidic acrylate adhesion promoter, CD 9055 | 0.5 |
| tris (2-hydroxy ethyl) isocyanurate triacrylate | 12 |
| ethylene glycol dimethacrylate | 18 |
| Water Phase | |
| water | 240 |
| polyvinyl alcohol solution 5% | 60 |
| 4,4'-azobis(4-cyanovaleric Acid) | 1 |

The batch is made by following the same process as Example 2, except by using the above formula, and the size is targeted at 10 um. The final median size of capsules is 10.2 um.

Example 6

|  | Grams |
|---|---|
| Internal Phase | |
| methyl palmitate | 168.3 |
| alkane wax, M 90 | 1.7 |
| 2,2'-azodi(2-methylbutyronitrile) | 0.3 |
| 1,1'-azobis(cyanocyclohexane) | 0.3 |
| acidic acrylate adhesion promoter, CD 9055 | 0.5 |
| tris (2-hydroxy ethyl) isocyanurate triacrylate | 12 |
| ethylene glycol dimethacrylate | 18 |
| Water Phase | |
| water | 240 |
| polyvinyl alcohol solution 5% | 60 |
| 4,4'-azobis(4-cyanovaleric acid) | 1 |

The batch is made by following the same process as Example 1, except by using the above formula, and the size is targeted at 10 um. The final median size of capsules is 9.2 um.

Example 7

The batch is made by following the same process as Example 6, except the size is targeted at 5 um. The final median size of capsules is 4.7 um.

Example 8

The batch is made by following the same process as Example 6, except the size is targeted at 20 um. The final median size of capsules is 22 um.

Example 9

| Internal Phase | Grams |
|---|---|
| methyl palmitate | 181.3 |
| n-octacosane, | 9.5 |
| alkane wax, M 90 | 1.9 |
| 2,2'-azodi(2-methylbutyronitrile) | 0.34 |
| 1,1'-azobis(cyanocyclohexane) | 0.34 |
| acidic acrylate adhesion promoter, CD 9055 | 0.38 |
| tris (2-hydroxy ethyl) isocyanurate triacrylate | 13.5 |
| ethylene glycol dimethacrylate | 9 |
| Water Phase | |
| water | 135 |
| polyvinyl alcohol solution 5% | 90 |
| 4,4'-azobis(4-cyanovaleric acid) | 0.75 |

The batch is made by following the same process as Example 1 up to the milling step, except by using the above formula, and the size is targeted at 10 um. After milling, the batch is held at 68 C for 2 hrs, and then heated to 87° C. in 5 hrs, then held at 85° C. for 12 hrs. The final median size of capsules is 10.8 um.

Example 10

| Internal Phase | Grams |
|---|---|
| methyl palmitate | 173.8 |
| n-octacosane, | 7.7 |
| N-octadecane | 9.6 |
| alkane wax, M 90 | 1.9 |
| 2,2'-azodi(2-methylbutyronitrile) | 0.34 |
| 1,1'-azobis(cyanocyclohexane) | 0.34 |
| acidic acrylate adhesion promoter, CD 9055 | 0.38 |
| tris (2-hydroxy ethyl) isocyanurate triacrylate | 13.8 |
| ethylene glycol dimethacrylate | 9.2 |
| Water Phase | |
| water | 135 |
| polyvinyl alcohol solution 5% | 90 |
| 4,4'-azobis(4-cyanovalerica) | 0.75 |

The batch is made by following the same process as Example 9, except by using the above formula, and the size is targeted at 10 um. The final median size of capsules is 10.8 um.

Example 11

| Internal Phase | Grams |
|---|---|
| methyl palmitate | 111.8 |
| n-octadecane | 19.8 |
| alkane wax, M 90 | 1.31 |
| dicyclohexylmethane-4,4'-diisocyanate | 14.6 |
| Water Phase 1 | |
| water | 192.1 |
| polyvinyl alcohol solution 10% | 34.3 |
| silicon dioxide | 2.3 |
| Water Phase 2 | |
| water | 68.8 |
| diethylenetriamine | 5.04 |

A water phase 1 preparation is begun by mixing all components and then holding at 65° C. A water phase 2 is prepared at room temperature and mixed until homogeneous in a separate container. The internal phase preparation is begun by mixing all components, except dicyclohexylmethane-4,4'-diisocyanate, and then heated to 65° C. until the alkane wax is completely dissolved. Dicyclohexylmethane-4,4'-Diisocyanate is then added to the internal phase until clear and homogenous. The internal phase is added to water phase 1, and then milled to form a stable emulsion at target size of 20 um over 20 minutes at 65° C. After milling, water phase 2 is transferred into the batch over 10 minutes and the batch is heated to 92° C. in 60 minutes, then held at 92° C. for 18 hours. The final median size of the microcapsules is 22.2 um.

Example 12

| Internal Phase | Grams |
|---|---|
| methyl palmitate | 125 |
| n-octacosane | 6.55 |
| alkane wax, M 90 | 1.31 |
| dicyclohexylmethane-4,4'-diisocyanate | 14.6 |
| Water Phase 1 | |
| water | 192.1 |
| polyvinyl alcohol solution 10% | 34.3 |
| silicon dioxide | 2.3 |
| Water Phase 2 | |
| water | 68.8 |
| diethylenetriamine | 5.04 |

This example is made by following the same procedure as Example 11. The final median size of capsules is 19.9 um.

Comparative Examples 13, 14

Different lots of commercially available microcapsule samples, Microtek Laboratories, Inc, Dayton, Ohio.

Comparative Examples 15, 16

Commercially available microcapsule samples, BASF Corporation, Florham, N.J.

Table 1 summarizes various parameters according to the above described test methods of the compositions described in Examples 1 to 16.

TABLE 1

| Examples | Delta T | Latent Heat | Melting Point | % Wt @ 180 C. | % Free Core | Rating Delta T | Rating Latent Heat | Rating Melting Point | Rating % Wt @ 180° C. | Rating % Free Core | TEI |
|---|---|---|---|---|---|---|---|---|---|---|---|
| Example 1 | 6.9 | 167.4 | 27.5 | 96.4 | 0.3 | 0.31 | 1 | 0.35 | 1.00 | 0.89 | 29002 |
| Example 2 (comparative example) | 7.6 | 161.8 | 27.5 | 95.6 | 14.2 | 0.25 | 0 | 0.32 | 0.78 | 0.00 | 0 |
| Example 3 | 6.6 | 168.5 | 27.6 | 98.4 | 0.6 | 0.34 | 1 | 0.38 | 1.00 | 0.82 | 31260 |
| Example 4 | 6.7 | 169.9 | 27.4 | 96.8 | 0.4 | 0.34 | 1 | 0.28 | 1.00 | 0.86 | 24229 |
| Example 5 (comparative example) | 17.7 | 166.7 | 27.4 | 96.9 | 0.4 | 0.00 | 1 | 0.26 | 1.00 | 0.87 | 0 |
| Example 6 | 9.7 | 186.8 | 29.7 | 95.1 | 0.8 | 0.03 | 1 | 0.17 | 0.53 | 0.72 | 600 |
| Example 7 (comparative example) | 10.1 | 164.7 | 29.8 | 84.9 | 5.2 | 0.00 | 0 | 0.16 | 0.00 | 0.00 | 0 |
| Example 8 | 9.4 | 166.5 | 29.9 | 96.3 | 1.8 | 0.06 | 1 | 0.09 | 1.00 | 0.41 | 642 |
| Example 9 | 6.0 | 179.0 | 29.8 | 95.7 | 0.9 | 0.40 | 1 | 0.13 | 0.86 | 0.70 | 9678 |
| Example 10 | 5.8 | 174.6 | 28.9 | 95.0 | 0.7 | 0.42 | 1 | 0.73 | 0.48 | 0.78 | 35104 |
| Example 11 | 7.5 | 175.4 | 27.3 | 98.99 | 0.5 | 0.25 | 1 | 0.21 | 1.00 | 0.84 | 13331 |
| Example 12 | 5.5 | 186.1 | 30.0 | 97.35 | 1.3 | 0.45 | 1 | 0.03 | 1.00 | 0.58 | 2095 |
| Example 13 (comparative example) | 4.4 | 192.3 | 28.2 | 92.7 | 5.6 | 0.56 | 1 | 0.79 | 0.00 | 0.00 | 0 |
| Example 14 (comparative example) | 7.2 | 168.9 | 27.9 | 84.6 | 5.7 | 0.28 | 1 | 0.61 | 0.00 | 0.00 | 0 |
| Example 15 (comparative example) | 4.3 | 103.1 | 25.5 | 94.9 | 0.5 | 0.57 | 0 | 0.00 | 0.47 | 0.83 | 0 |
| Example 16 (comparative example) | 2.5 | 108.5 | 26.4 | 76.0 | 0.2 | 0.76 | 0 | 0.00 | 0.00 | 0.93 | 0 |

In Table 1, in applying the TEI formula, a rating is used in the columns prefaced "Rating". For Delta T, the rating is based on a sliding inverse scale of 0 to 1 assigned on the basis of 0 for Delta T greater than 10° C., and 1 for a Delta T of 0° C.

For the Rating Latent Heat, a value of 1 is assigned if the latent heat is at least 165 Joules per gram, and a value of 0 is assigned if less than 165 Joules per gram.

For Rating Melting Point, a value between 0 and 1 is assigned based on a value of 1 at 28.5° C. The range is 27° C. to 30° C. for values between 0 to 1. The assigned value is based on the position in the stated range and relative difference from 28.5° C., expressed as a fraction from 1 to 0 starting with 28.5° C. as a value of 1. Above or below this range a value of 0 is assigned.

For Rating % Wt at 180° C., a value between 0 and 1 is assigned based on 0 for 94% or less remaining; 1 for 96% or greater remaining; and 0 to 1 for the range 94% to 96%.

For Rating % Free Core, a value between 0 and 1 is assigned based on 0 to 1 for free wax of less than 3%. 1 indicates no free wax detected.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Uses of singular terms such as "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

What is claimed is:

1. A microencapsulated phase change material comprising a particle comprising a core material and a wall material selected from the group consisting of polyacrylate, polymethacrylate, polyamine, polyurea, polyurethane, melamine formaldehyde, and mixtures thereof, that surrounds the core material, the particle having a Thermal Efficiency Index of at least 10,000; wherein said particle's core material comprises from 50 to 97 wt % of a methyl ester derived from palm oil, from 0.1 to 20 wt % of a straight chain alkane and from 0.1 to 25 wt % of a wax.

2. The microencapsulated phase change material of claim 1, wherein the wax is selected from the group of waxes consisting of alkane wax, polyethylene wax, carnauba wax, candelilla wax, vegetable wax, beeswax and paraffin wax.

3. The microencapsulated phase change material according to claim 2, wherein the core material comprises:
   from 50 to 95 wt % of methyl palmitate;
   from 0.1 to 20 wt % of octacosane; and
   from 0 to 40 wt % of polyethylene wax.

4. The microencapsulated phase change material of claim 1, wherein said particle comprises at least 1 wt % of the core material.

5. The microencapsulated phase change material of claim 1, wherein said particle comprises from about 20 to about 95 wt % of the core material.

6. The microencapsulated phase change material of claim 1, wherein said particle comprises from about 50 to about 90 wt % of the core material.

7. The microencapsulated phase change material according to claim 1, having a differential scanning calorimetric melt point peak T1 of the microencapsulated phase change material of not more than 30° C. and a resolidification peak T2 of not less than 18° C., and wherein the absolute value of the difference between the respective melt point peak T1 and resolidification peak T2 is not more than 10° C.

8. The microencapsulated phase change material according to claim 7, wherein the methyl ester is selected from methyl laurate, methyl myristate, methyl palmitate, methyl stearate, or methyl oleate.

9. The microencapsulated phase change material according to claim 7, wherein the phase change material has a latent heat of at least 165 Joules per gram.

10. The microencapsulated phase change material according to claim 1, having a differential scanning calorimetric melt point peak T1 of the microencapsulated phase change material of not more than 30° C. and a resolidification peak T2 of not less than 18° C., and wherein the absolute value of the difference between the respective melt point peak T1 and resolidification peak T2 is not more than 10° C.

11. The microencapsulated phase change material according to claim 10, wherein the core material comprises a blend of methyl palmitate, octacosane and alkane wax.

12. The microencapsulated phase change material according to claim 10, wherein the core material comprises:
    (A) 55 to 95 wt % of methyl palmitate;
    (B) 0.1 to 10 wt % of octacosane; and
    (C) 0 to 30 wt % of one or more additional phase change materials other than phase change materials (A) and (B),
wherein the weight percent of (A), (B), and (C) is based on the total weight of the phase change material.

13. The microencapsulated phase change material according to claim 12, wherein the latent heat storage density on a volumetric basis is greater than 165 Joules per gram.

14. An article of manufacture incorporating the microencapsulated phase change material according to claim 1.

15. The article of manufacture according to claim 14, wherein the article is selected from textiles, foams, pillows, mattresses, bedding, cushions, cosmetics, medical devices, packaging, cooling fluids, wallboard, and insulation.

* * * * *